United States Patent
Ruokolainen

(10) Patent No.: US 11,322,913 B2
(45) Date of Patent: May 3, 2022

(54) EXTERNALLY GAPPED LINE ARRESTER

(71) Applicant: Hitachi Energy Switzerland AG, Baden (CH)

(72) Inventor: Hannu Ruokolainen, Ludvika (SE)

(73) Assignee: Hitachi Energy Switzerland AG, Baden (CH)

( * ) Notice: Subject to any disclaimer, the term of this patent is extended or adjusted under 35 U.S.C. 154(b) by 102 days.

(21) Appl. No.: 16/714,185

(22) Filed: Dec. 13, 2019

(65) Prior Publication Data
US 2020/0119528 A1 Apr. 16, 2020

Related U.S. Application Data

(63) Continuation of application No. PCT/EP2019/073954, filed on Sep. 9, 2019.

(30) Foreign Application Priority Data

Sep. 28, 2018 (EP) .................................. 18197696

(51) Int. Cl.
*H02H 9/06* (2006.01)
*H01T 4/16* (2006.01)
(Continued)

(52) U.S. Cl.
CPC ............... *H01T 4/02* (2013.01); *H02H 9/06* (2013.01); *H01C 7/12* (2013.01); *H01C 8/04* (2013.01); *H01T 4/16* (2013.01)

(58) Field of Classification Search
CPC ... H02H 9/06; H01C 7/12; H01C 8/04; H01T 4/16
(Continued)

(56) References Cited

U.S. PATENT DOCUMENTS

| 1,061,671 | A |   | 5/1913 | Hilliard et al. |
| 4,326,233 | A | * | 4/1982 | Yanabu ..................... H01T 1/06 313/633 |

(Continued)

FOREIGN PATENT DOCUMENTS

| CN | 202034150 U | 11/2011 |
| CN | 202940459 U | 5/2013 |

(Continued)

OTHER PUBLICATIONS

Extended European Search Report Application No. EP 18 197 696 Completed: Mar. 11, 2019; dated Mar. 20, 2019 8 pages.
(Continued)

*Primary Examiner* — Gary A Nash
(74) *Attorney, Agent, or Firm* — Sage Patent Group

(57) ABSTRACT

An externally gapped line arrester, EGLA, for transmission lines, the EGLA including a series varistor unit, SVU, having a first end and a second end, the SVU configured to be connected between a transmission line and ground, a primary sparkover gap unit serially connected to the first end of the SVU, a secondary gap arranged between the second end of the SVU and ground, and the secondary gap serially connected to the second end of the SVU, a shorting-link device connected in parallel with the secondary gap, and a disconnecting device arranged in the shorting-link device, the disconnecting device configured to open the shorting-link device when the SVU is overloaded. A method for impulse protection performed by an EGLA is also disclosed.

19 Claims, 3 Drawing Sheets

(51) Int. Cl.
  *H01C 7/12* (2006.01)
  *H01C 8/04* (2006.01)
  *H01T 4/02* (2006.01)

(58) Field of Classification Search
  USPC .................. 361/39, 40, 117, 120, 130, 132
  See application file for complete search history.

(56) References Cited

U.S. PATENT DOCUMENTS

| | | | | |
|---|---|---|---|---|
| 4,725,917 | A | * | 2/1988 | Mori .................. H01T 4/14 361/127 |
| 5,283,709 | A | * | 2/1994 | Shirakawa ............ H02G 13/80 361/117 |
| 6,108,187 | A | * | 8/2000 | Podporkin ........... H01B 17/005 174/144 |
| 8,711,538 | B2 | | 4/2014 | Woodworth et al. |
| 2012/0087055 | A1 | * | 4/2012 | Woodworth ............ H01T 4/14 361/127 |

FOREIGN PATENT DOCUMENTS

| | | | | |
|---|---|---|---|---|
| CN | 104600567 | A | | 5/2015 |
| CN | 102930943 | B | | 8/2016 |
| CN | 106448977 | A | * | 2/2017 |
| CN | 106601397 | A | * | 4/2017 |
| CN | 206293230 | U | | 6/2017 |
| EP | 0004351 | A1 | * | 10/1979 .............. H01C 7/12 |
| EP | 0013401 | B1 | * | 11/1983 .............. H01T 1/15 |
| EP | 3073588 | A1 | * | 9/2016 .............. H01C 7/12 |
| EP | 3293839 | A2 | * | 3/2018 .............. H02H 7/24 |
| EP | 3293839 | A2 | | 3/2018 |
| RU | 2096882 | C1 | * | 11/1997 |
| RU | 2248079 | C2 | * | 3/2005 |
| WO | 2011112536 | A1 | | 9/2011 |

OTHER PUBLICATIONS

International Search Report and Written Opinion of the International Searching Authority Application No. PCT/EP2019/073954 Completed: Sep. 18, 2019; dated Sep. 30, 2019 10 pages.

Chinese First Office Action dated Aug. 31, 2021 for Chinese Patent Application No. 201980063898.8, 8 pages (including English translation).

* cited by examiner

EXTERNALLY GAPPED LINE ARRESTER

TECHNICAL FIELD

The invention relates to an externally gapped line arrester and a method for transmission line impulse protection thereof.

BACKGROUND

Protection of transmission lines against the risk of lightning-induced flashover can be achieved by the use of Externally Gapped Line Arresters (EGLA) connected electrically in parallel with the line insulators on the transmission line towers. The EGLA traditionally consists of a single external gap in series with a series varistor unit (SVU). When lightning strikes the transmission line, the series gap is dimensioned to sparkover, which brings the SVU into conduction and allows the lightning surge current to be diverted safely to ground without a flashover of the line insulator. Due to a number of reasons, the SVU can be overloaded and it is then important that the line can be energized and remain in service even with the SVU out of service. Hence it has been traditionally necessary to dimension the gap distance large enough to ensure that it does not sparkover for e.g. switching-induced impulses.

Achieving a suitable design of the series gap of an EGLA can be difficult to meet due to the conflicting criteria that it must sparkover for lightning but not for switching impulses. The difficulties in achieving a suitable design increases with increased transmission voltage.

SUMMARY

An object of the present invention is to provide a design of an EGLA, which design can focus primarily on sparkover for lightning.

According to a first aspect there is presented an externally gapped line arrester (EGLA) for transmission lines. The EGLA comprising a series varistor unit (SVU) having a first end and a second end, the SVU configured to be connected between a transmission line and ground, a primary sparkover gap unit serially connected to the first end of the SVU, a secondary gap arranged between the second end of the SVU and ground, and the secondary gap serially connected to the second end of the SVU, a shorting-link device connected in parallel with the secondary gap, and a disconnecting device arranged in the shorting-link device, the disconnecting device configured to open the shorting-link device when the SVU is overloaded.

By the presented EGLA, with a controlled addition of a second series gap, achieving a suitable design of the EGLA is facilitated. Even though the presented EGLA is most useful for extra high-voltage application, it is also usable for applications of lower and higher voltages.

The primary sparkover gap unit may be configured to sparkover for lightning impulses and for switching impulses and not for power frequency temporary overvoltage (TOV).

The primary sparkover gap unit may be configured to sparkover for lightning impulses and not for TOV.

The secondary gap may be configured to not sparkover for switching impulses.

The secondary gap, together with the primary sparkover gap, may be configured to not sparkover for switching impulses.

The disconnecting device may be configured to open the shorting-link device by separating the shorting-link device into two separate parts.

The EGLA may be dimensioned for ultra-high-voltage.

The shorting-link device may be a visual fault indicator for the SVU.

The disconnecting device may comprise an explosive charge with a passive trigger.

According to a second aspect there is presented a method for impulse protection for transmission lines. The method is performed in an EGLA, and the method comprises when a SVU connected between a transmission line and ground is overloaded, by sparkover of a primary sparkover gap unit serially connected between a first end of the SVU and the transmission line, opening a shorting-link device by a disconnecting device, the shorting-link device arranged in parallel with a secondary gap serially arranged between the second end of the SVU and ground.

The voltage of the sparkover may be induced by a lightning impulse or a switching impulse and not by a TOV.

The secondary gap may be configured to not sparkover for switching impulses.

The secondary gap, together with the primary sparkover gap, may be configured to not sparkover for switching impulses.

The opening step may comprise activation of a disconnecting device to divide the shorting-link device into two separate parts.

The EGLA may be dimensioned for ultra-high-voltage.

The method may further comprise visually indicating operational status of the SVU.

Generally, all terms used in the claims are to be interpreted according to their ordinary meaning in the technical field, unless explicitly defined otherwise herein. All references to "a/an/the element, apparatus, component, means, step, etc.," are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

A physical air gap spacing, or strike distance, between the electrodes in an Externally Gapped Line Arresters (EGLA), partly defines the critical flashover voltage (CFO) for a given impulse. In addition, the shape or form of the gap electrodes also plays a role and this defines a so called "gap factor" which contributes to the probability of a flashover for a given surge or impulse. A large gap spacing with high gap factor may be needed to ensure that the EGLA will not flashover for switching surges when the series varistor unit (SVU) of the EGLA is non-functioning. However, a sufficient spacing with a high gap factor for switching impulses may not be possible to achieve with a specific configuration otherwise needed to operate properly for lightning impulses. By the addition of a secondary gap in series, only when the SVU is out of function, the primary gap can be easily designed to cope with lightning impulses and the introduced secondary gap will permit switching impulses of defined magnitude to also be handled without flashover. The gap factor may be improved by having more than one gap in series.

A secondary series gap is added depending on the status of the SVU as a means to increase the switching impulse withstand voltage (SIWV)/basic switching level (BSL) of the EGLA in order to withstand switching-induced impulses of greater magnitude. This is important for ultra-high-voltage applications, but may also be useful for applications of lower voltages.

By a controlled addition of a secondary series gap, only when the SVU is out of function, the primary series gap can be designed to cope with lightning impulses, switching impulses and power frequency temporary overvoltages (TOVs). By introduction of the secondary gap, improved performance will be possible against switching impulses of defined magnitude and in the case of failed SVU without flashover of the line insulation. The primary series gap may e.g. be designed to sparkover for lightning impulses and for switching impulses in normal service, since when the SVU is out of function the secondary series gap together with the primary gap will prevent sparkover for switching impulses. The secondary series gap may also be designed to prevent sparkover for switching impulses without consideration to the primary gap.

Figure 1:
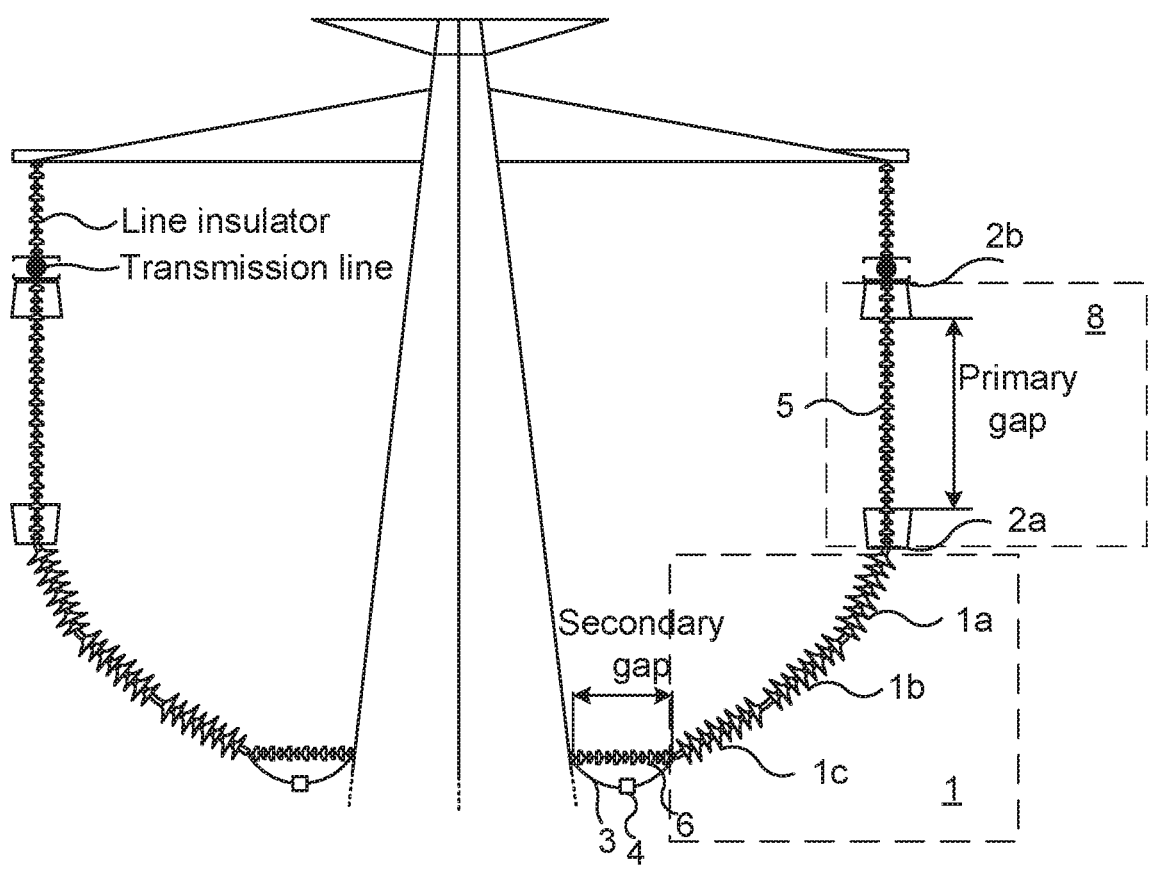
FIG. 1 is a schematic diagram illustrating an EGLA according to an embodiment presented herein.

An embodiment of an EGLA for transmission lines is presented with reference to FIG. 1. A transmission line is supported by a transmission line tower, through a line insulator. The EGLA is arranged between the transmission line and the transmission line tower, and electrically in parallel with the line insulator. The EGLA comprises a primary sparkover gap between a first end of a SVU 1 and the transmission line. The EGLA further comprises a secondary gap between the second end of the SVU 1 and ground (through the transmission line tower). The SVU 1, the primary sparkover gap and the secondary gap are serially connected. The EGLA also comprises a shorting-link device 3 connected in parallel with the secondary gap, and a disconnecting device 4 arranged in the shorting-link device 3.

The SVU 1 comprises three varistors $1a$, $1b$ and $1c$ connected serially through flexible links. The number of series varistors may however be adapted in dependence on the transmission voltage of the transmission lines.

The primary sparkover gap is provided by a primary sparkover gap unit 8 comprising a suspension insulator 5 with gap electrodes $2a$ and $2b$ at its ends. With design consideration to only lightning impulses and TOV, selection of specifics for the suspension insulator and gap electrodes are straight forward for a person skilled in the art.

The secondary gap is over a suspension insulator 6. With design consideration to not allow switching impulses over the primary sparkover gap and the secondary gap, selection of specifics for the suspension insulator are straight forward for a person skilled in the art.

The shorting-link device 3 is a conducting connection between the second end of the SVU 1 and the ground. It may be in the form of e.g. a wire, cable, chain, conductor, rod, tube, linkage or other means suitable of passing current.

The disconnecting device 4 is configured to trigger operation at a predetermined overload current. The disconnecting device 4 may e.g. comprise an explosive charge with a passive trigger.

The shorting-link device 3 may further be used as an operation status indicator for the SVU 1. After an overload of the SVU 1, the disconnecting device 4 will have separated the wire of the shorting-link device 3 into two separate parts, which two separate parts thereafter will hang straight down from the SVU 1 and ground, respectively. It will be easily visible from a distance, even from ground or air, to observe that the SVU 1 is no longer operational as intended. Even though the disconnecting device 4 is illustrated as arranged in the middle of the shorting-link device 3, it may in other variations be arranged in different parts of the shorting-link device 3. It may e.g. be arranged close to the SVU 1, resulting in the shorting-link device 3 hanging down along the transmission line tower, or e.g. be arranged close to the transmission line tower, resulting in the shorting-link device 3 hanging down from the SVU 1.

The transmission line the EGLA is configured to be attached to during use, may be an extra high-voltage transmission line. The ground the EGLA is configured to be attached to during use, may be the transmission tower for the transmission line.

Figure 2:
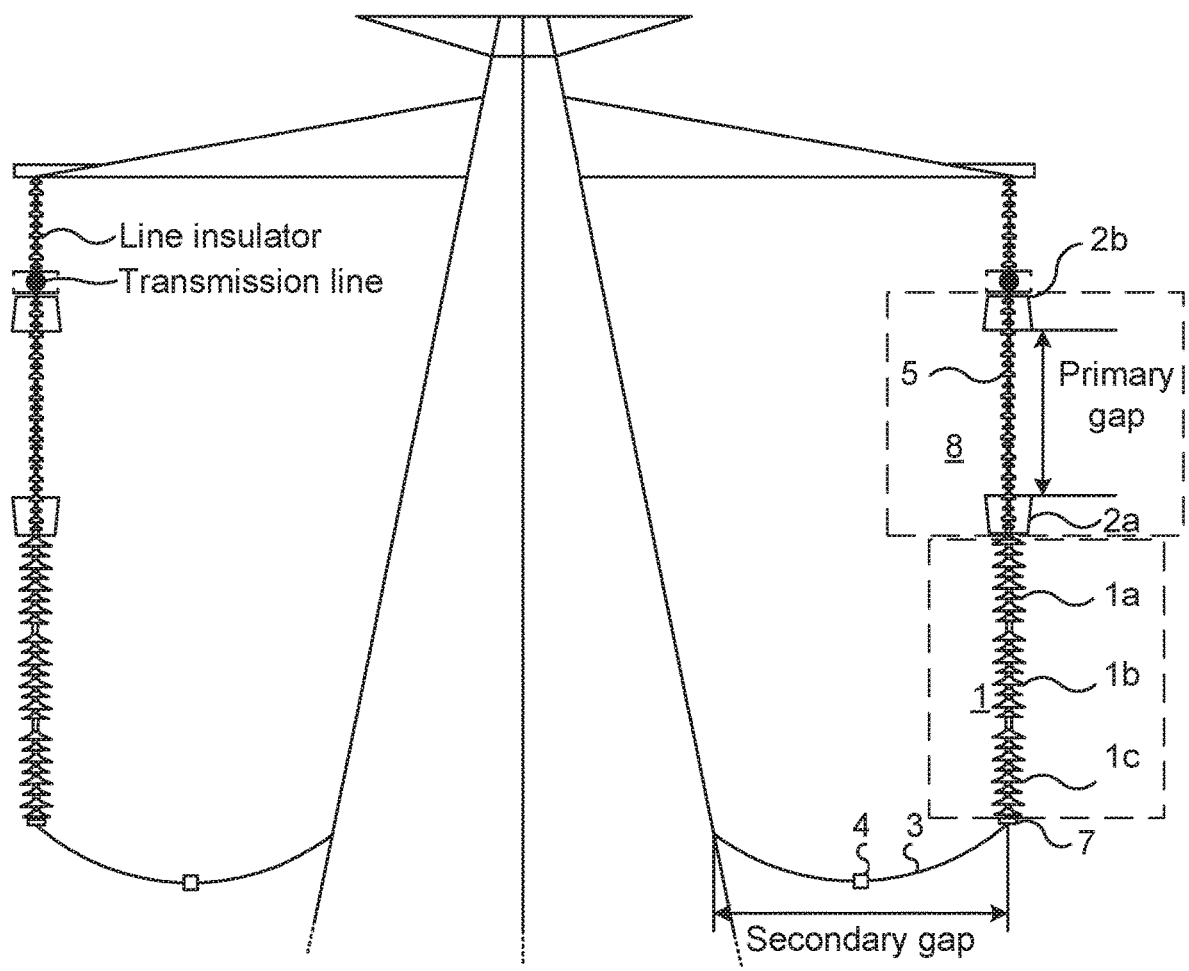
FIG. 2 is a schematic diagram illustrating an EGLA according to an embodiment presented herein.

An embodiment of an EGLA for transmission lines is presented with reference to FIG. 2. A transmission line is supported by a transmission line tower, through a line insulator. The EGLA is arranged between the transmission line and the transmission line tower, and electrically in parallel with the line insulator. The EGLA comprises a primary sparkover gap between a first end of a SVU 1 and the transmission line. The EGLA further comprises a secondary gap between the second end of the SVU 1 and ground (through the transmission line tower). The SVU 1, the primary sparkover gap and the secondary gap are serially arranged. The EGLA also comprises a shorting-link device 3 in parallel with the secondary gap, and a disconnecting device 4 arranged in the shorting-link device 3.

The SVU 1 comprises three varistors $1a$, $1b$ and $1c$ connected serially through flexible or fixed links. The number of varistors may be adapted in dependence on the transmission voltage of the transmission lines. The second end of the SVU 1 may be provided with a bottom weight 7 to keep the EGLA relatively non-movably hanging straight down.

The primary sparkover gap is arranged by a primary sparkover gap unit 8 comprising a suspension insulator 5 with gap electrodes $2a$ and $2b$ at its ends. With design consideration to only lightning impulses and TOV, selection of specifics for the suspension insulator and gap electrodes are straight forward for a person skilled in the art.

The secondary gap is over air. With design consideration to not allow switching impulses over the primary sparkover gap and the secondary gap, selection of specifics for the air gap are straight forward for a person skilled in the art.

The shorting-link device 3 is a conducting connection between the second end of the SVU 1 and the ground. It may be in the form of e.g. a wire, cable, chain, conductor, rod, tube, linkage or other means suitable of passing current.

The disconnecting device 4 is configured to trigger operation at a predetermined overload current. The disconnecting device 4 may e.g. comprise an explosive charge with a passive trigger.

The shorting-link device 3 may further be used as an operation status indicator for the SVU 1. After an overload of the SVU 1, the disconnecting device 4 will have separated the wire of the shorting-link device 3 into two separate parts, which two separate parts thereafter will hang straight down from the SVU 1 and ground, respectively. It will be easily visible from a distance, even from ground or air, to observe that the SVU 1 is no longer operational as intended. Even though the disconnecting device 4 is illustrated as arranged in the middle of the shorting-link device 3, it may in other variations be arranged in different parts of the shorting-link device 3. It may e.g. be arranged close to the SVU 1, resulting in the shorting-link device 3 hanging down along the transmission line tower, or e.g. be arranged close to the transmission line tower, resulting in the shorting-link device 3 hanging down from the SVU 1.

An embodiment of an EGLA for transmission lines is presented with reference to FIGS. 1 and 2. The EGLA comprises a SVU 1 having a first end and a second end, the SVU 1 is configured to be connected between a transmission line and ground, a primary sparkover gap unit 8 serially connected to the first end of the SVU 1, a secondary gap arranged between the second end of the SVU 1 and ground, and the secondary gap serially connected to the second end of the SVU 1, a shorting-link device 3 connected in parallel with the secondary gap, and a disconnecting device 4 arranged in the shorting-link device, the disconnecting device configured to open the shorting-link device when the SVU 1 is overloaded.

The primary sparkover gap unit may be configured to sparkover for lightning and switching impulses, but not for TOVs.

The primary sparkover gap unit may alternatively be designed not to sparkover for switching impulses, but still for lightning impulses.

The secondary gap may be configured to not sparkover for switching impulses.

The secondary gap, together with the primary gap, may be configured to not sparkover for switching impulses, when the SVU has been overloaded.

The disconnecting device may comprise an explosive charge, configured to open the shorting-link device 3 by separating the shorting-link device 3 into two separate parts.

The EGLA may be dimensioned for ultra-high-voltage, i.e. above 800 kV.

The shorting-link device may be a visual fault indicator for the SVU.

Figure 3:
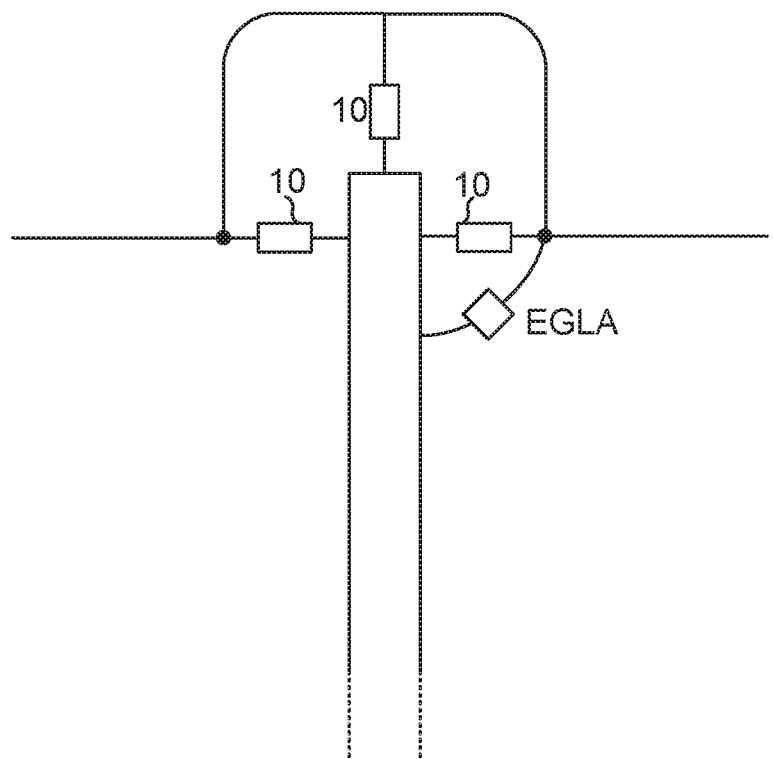
FIG. 3 is a schematic diagram illustrating an EGLA in relation to tower insulators.

The embodiments illustrated in connection with FIGS. 1 and 2, are schematically illustrated in a view parallel to the transmission lines. FIG. 3 schematically illustrates disposition of EGLAs in a view perpendicular to the transmission lines. Line insulators 10 are arranged between the transmission line and the transmission line tower, and the EGLAs are arranged between the transmission line and the tower, i.e. electrically in parallel to the insulators 10. A line insulator may e.g. be a tension insulator or a suspension insulator.

Although the EGLA has been illustrated in the drawings to be arranged down from the transmission line to the transmission tower mast, the EGLA may instead be arranged down from the transmission line supporting cross-arm down to the transmission line.

Figure 4:
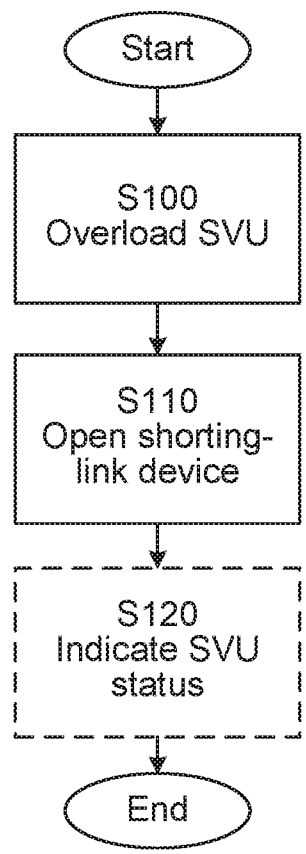
FIG. 4 is a flow chart illustrating a method for an embodiment presented herein.

An embodiment for a method for impulse protection for transmission lines is presented with reference to FIG. 4. The method is performed in an EGLA, and the method comprises when a SVU connected between a transmission line and ground is overloaded S100, by sparkover of a primary sparkover gap unit serially connected between a first end of the SVU and the transmission line, opening S110 a shorting-link device by a disconnecting device, the shorting-link device arranged in parallel with a secondary gap serially arranged between the second end of the SVU and ground. The disconnecting device is arranged at the shorting-link device.

The voltage of the sparkover may be induced by a lightning impulse or a switching impulse and not by a TOV.

The secondary gap may be configured to not sparkover for switching impulses.

The secondary gap, together with the primary gap, may be configured to not sparkover for switching impulses, when the SVU has been overloaded.

The opening step may comprise activation of an explosive charge to open the shorting-link device into two separate parts.

The EGLA may be dimensioned for ultra-high-voltage.

The method may further comprise visually indicating S120 operation status of the SVU.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An externally gapped line arrester (EGLA) for transmission lines, comprising:
   a series varistor unit (SVU) having a first end and a second end, the SVU configured to be connected between a transmission line and ground;
   a primary sparkover gap provided by a primary sparkover gap unit serially connected to the first end of the SVU and comprising a suspension insulator with gap electrodes;
   a shorting-link device connected between the second end of the SVU and ground, and in parallel with a secondary gap arranged between the second end of the SVU and ground, the secondary gap and the primary sparkover gap being serially arranged; and
   a disconnecting device arranged in the shorting-link device, the disconnecting device configured to open the shorting-link device when the SVU is overloaded.

2. The EGLA according to claim 1, wherein the primary sparkover gap unit is configured to sparkover for lightning impulses and for switching impulses and not for power frequency temporary overvoltage (TOV).

3. The EGLA according to claim 2, wherein the secondary gap is configured to not sparkover for switching impulses.

4. The EGLA according to claim 2, wherein the secondary gap, together with the primary sparkover gap unit, is configured to not sparkover for switching impulses.

5. The EGLA according to claim 2, wherein the disconnecting device is configured to open the shorting-link device by separating the shorting-link device into two separate parts.

6. The EGLA according to claim 1, wherein the primary sparkover gap unit is configured to sparkover for lightning impulses and not for power frequency temporary overvoltage (TOV).

7. The EGLA according to claim 1, wherein the secondary gap is configured to not sparkover for switching impulses.

8. The EGLA according to claim 1, wherein the secondary gap, together with the primary sparkover gap unit, is configured to not sparkover for switching impulses.

9. The EGLA according to claim 1, wherein the disconnecting device is configured to open the shorting-link device by separating the shorting-link device into two separate parts.

10. The EGLA according to claim 1, wherein the EGLA is dimensioned for ultra-high-voltage.

11. The EGLA according to claim 1, wherein the shorting-link device is a visual fault indicator for the SVU.

12. The EGLA according to claim 1, wherein the disconnecting device includes an explosive charge with a passive trigger.

13. A method for impulse protection for transmission lines, the method being performed in an externally gapped line arrester (EGLA), the method comprising:
   when a series varistors unit (SVU) connected between a transmission line and ground is overloaded, by sparkover of a primary sparkover gap unit serially connected between a first end of the SVU and the transmission line, the primary sparkover gap unit comprising a suspension insulator with gap electrodes,
   opening a shorting-link device by a disconnecting device, the shorting-link device arranged in parallel with a secondary gap serially arranged between the second end of the SVU and ground.

14. The method according to claim 13, wherein the voltage of the sparkover is induced by a lightning impulse or a switching impulse and not by a power frequency temporary overvoltage (TOV).

15. The method according to claim 13, wherein the secondary gap is configured to not sparkover for switching impulses.

16. The method according to claim 13, wherein the secondary gap, together with the primary sparkover gap unit, is configured to not sparkover for switching impulses.

17. The method according to claim 13, wherein the opening step includes activation of a disconnecting device to divide the shorting-link device into two separate parts.

18. The method according to claim 13, wherein the EGLA is dimensioned for ultra-high-voltage.

19. The method according to claim 13, further comprising visually indicating operational status of the SVU.

* * * * *